United States Patent
Sebire et al.

(10) Patent No.: US 7,804,850 B2
(45) Date of Patent: Sep. 28, 2010

(54) SLOW MAC-E FOR AUTONOMOUS TRANSMISSION IN HIGH SPEED UPLINK PACKET ACCESS (HSUPA) ALONG WITH SERVICE SPECIFIC TRANSMISSION TIME CONTROL

(75) Inventors: Benoist Sebire, Beijing (CN); Jukka Nauha, Oulu (FI); Anna-Mari Vimpari, Oulu (FI); Esa Malkamaki, Espoo (FI); Matti Jokimies, Salo (FI)

(73) Assignee: Nokia Corporation, Espoo (FI)

( * ) Notice: Subject to any disclaimer, the term of this patent is extended or adjusted under 35 U.S.C. 154(b) by 1025 days.

(21) Appl. No.: 11/239,706

(22) Filed: Sep. 29, 2005

(65) Prior Publication Data

US 2006/0120404 A1 Jun. 8, 2006

Related U.S. Application Data

(60) Provisional application No. 60/615,377, filed on Oct. 1, 2004, provisional application No. 60/706,360, filed on Aug. 8, 2005.

(51) Int. Cl.
*H04J 3/22* (2006.01)
(52) U.S. Cl. .................. 370/468; 370/230; 370/445
(58) Field of Classification Search .............. 370/230, 370/445, 468
See application file for complete search history.

(56) References Cited

U.S. PATENT DOCUMENTS

| 7,215,653 | B2 * | 5/2007 | Kim et al. ................ 370/329 |
| 7,450,555 | B2 * | 11/2008 | Kim .......................... 370/342 |
| 2004/0160914 | A1 * | 8/2004 | Sarkar ...................... 370/329 |
| 2004/0228349 | A1 * | 11/2004 | Vrzic et al. .............. 370/395.4 |
| 2005/0143018 | A1 * | 6/2005 | Shinozaki .................... 455/76 |
| 2005/0259690 | A1 | 11/2005 | Garudadri et al. ......... 370/477 |

OTHER PUBLICATIONS

3rd Generation Partnership Project; Technical Specification Group Radio Access Network; FDD Enhanced Uplink; Physical Layer Aspects (Release 6) 3GPP TP 25.808 V6.0.0 (Mar. 2005).
3rd Generation Partnership Project; Technical Specification Group Radio Access Network; FDD Enhanced Uplink; Overall description; Stage 2 (Release 6) 3GPP TS 25.309 V6.3.0 (Jun. 2005).

* cited by examiner

*Primary Examiner*—Jason E Mattis
(74) *Attorney, Agent, or Firm*—Harrington & Smith

(57) ABSTRACT

A system and methods for slow medium access control entity (MAC-e) for autonomous transmission during High Speed Uplink Packet Access (HSUPA), and for service specific transmission time control in HUSPA, wherein a control parameter that is independent from the air interface transmission time interval (TTI), hybrid automatic repeat request (HARQ) processes or enhanced dedicated transport channel (E-DCH) scheduling is used. This control defines the minimum time interval between subsequent new transmissions. The control has no impact on retransmissions, which are performed normally.

33 Claims, 5 Drawing Sheets

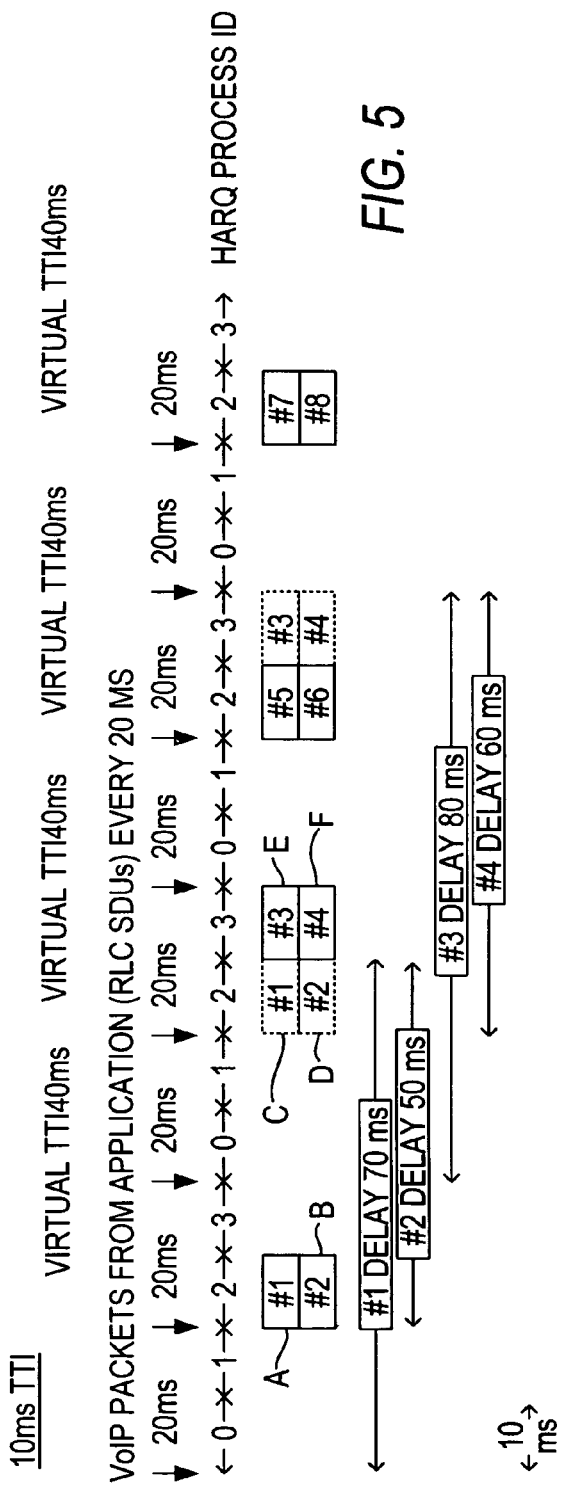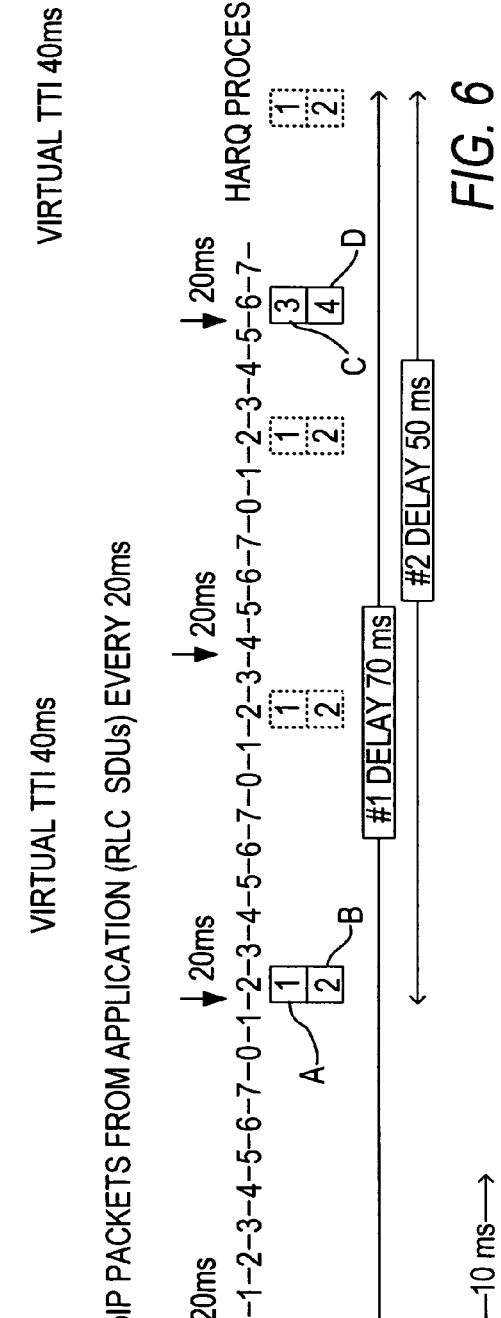

SLOW MAC-E FOR AUTONOMOUS TRANSMISSION IN HIGH SPEED UPLINK PACKET ACCESS (HSUPA) ALONG WITH SERVICE SPECIFIC TRANSMISSION TIME CONTROL

RELATED APPLICATIONS

This application claims priority from U.S. Provisional Patent Application Ser. No. 60/615,377 which was filed on Oct. 1, 2004 and U.S. Provisional Patent Application Ser. No. 60/706,360 which was filed on Aug. 8, 2005.

BACKGROUND OF THE INVENTION

1. Field of the Invention

The invention is related to the $3^{rd}$ Generation Partnership Project (3GPP) radio access network (RAN) standards, high speed uplink packet access (HSUPA) and high speed downlink packet access (HSDPA), and 3GPP Core Network and Speech Codecs and, more particularly, to a system and methods for slow medium access control entity (MAC-e) for autonomous transmission during HSUPA, an for service specific transmission time control in HSUPA.

2. Detailed Description of the Related Art

The Third Generation Partnership Project (3GPP) Technical Specification (TS) 25.309, "Frequency Division Duplex (FDD) Enhanced Uplink; Overall description; Stage 2 TS" has established that some level of enhanced dedicated channel (E-DCH) minimum set support is required to provide backward system compatibility. With a minimum set, autonomous transmission of data packets can occur in an uplink signal without prior allocation of resources by a base station (i.e., Node B) scheduler. In other words, for each user equipment (UE), the minimum set defines a set of transport formats (TFs) for which a valid scheduling grant is not required in order for packets to be transmitted. In normal conditions, the Node B allocates a share of an uplink resource to the UE via a scheduling grant. Only after this allocation of resources occurs is it possible for the UE to transmit packets in the uplink signal. The defined minimum set always guarantees a minimum bit rate, which is typically used for signaling purposes.

From the perspective of the Node B scheduler, the possibility for non-scheduled UEs to autonomously transmit a set of TFs has implications on Node B processing resources, because Node Bs must be continuously ready to process transmissions made from all such UEs, irrespective of the number of UEs that actually perform an autonomous transmission. As a result, the ability of the Node Bs to optimize the use of available Node B processing resources via scheduling becomes limited. Consequently, the complexity of the Node B for processing a given number of TFs may become increased.

The potential for a number of UEs to perform unscheduled autonomous transmissions may require the reservation of a "Rise over Thermal" (RoT) margin for these UEs. In the case of a 2 ms transmission time interval (TTI), a medium access control entity (MAC-e) protocol data unit (PDU) size of 360 bits, and n non-scheduled UEs, the worst case combined data rate in the cell due to autonomous transmission is n*45 kb/sec for a fixed total number of retransmissions of 4. Here, an assumption is made that the 45 kb/sec rate is achieved by transmitting at 180 kb/sec four times, at a reduced power level. With a large number of UEs, the required RoT margin may become significant, which would then degrade the performance of the scheduled transmissions.

The R1-041069 specification, "Signaling Radio Bearer (SRB) Mapping, E-DCH Minimum Set and Node B Complexity Issues", developed by Motorola, Inc., includes proposed solutions to the foregoing problems, such as restricting the scenarios in which the minimum set applies to cases where, for example, there is no dedicated physical data channel (DPDCH). In the R1-041087 specification, "Autonomous Transmission with Time Division Multiplex (TDM)", developed by Samsung, the technique disclosed uses a TDM based solution, where autonomous transmissions are only allowed in a subset of TTIs. Another solution proposed in the R1-041211 specification, "Support of Low Minimum Rate for E-DCH", developed by Lucent Technologies, involves increasing the permitted number of hybrid automatic repeat request (HARQ) transmissions for autonomous transmission rates, or restricting the number of HARQ processes that the UE is permitted to use for autonomous transmissions. However, each of these solutions is less than optimal because they all require a high level of complexity.

The concept of enhanced dedicated channels (E-DCH) support was introduced in 3GPP Rel-6. For an E-DCH transmission, a grant is required, i.e., a non-scheduled grant is required for non-scheduled medium access control dedicated (MAC-d) flows and a serving grant is required for a scheduled transmission. For the scheduled MAC-d data flows, the Node B controls when the UE is allowed to transmit packets and the maximum enhanced dedicated physical data channel (E-DPDCH) to dedicated physical control channel (DPCCH) power ratio that the UE is allowed to use for scheduled data in the following transmission. For the non-scheduled MAC-d flows, the network is permitted to define a maximum number of bits that can be included in a MAC-e PDU for specific MAC-d flows.

In the case of a 2 ms E-DCH TTI, each non-scheduled grant is applicable for the specific set of HARQ processes indicated by radio resource control (RRC), where the RRC can also restrict the set of HARQ processes for which scheduled grants are applicable. Here, the data mapped on non-scheduled MAC-d flows is transmitted as soon as possible by the possible HARQ process restrictions and the possible available power restrictions, with the rate defined by the non-scheduled grant.

The Universal Telecommunication Radio Access Network (UTRAN) is limited in its ability to control the uplink (UL) transmission interval on an E-DCH. The UTRAN can select the TTI to be either 2 ms or 10 ms, when 2 ms TTI is supported by the UE. In the case of a 2 ms TTI, the UTRAN can define the permitted processes for scheduled MAC-d flows and non-scheduled MAC-d flows. Here, it is the base transceiver station (BTS) that decides the scheduling grants of scheduled transmission.

The transmission of a low bit rate service over E-DCH introduces the requirement for large control overhead due to several control channels in the uplink (UL) and the downlink (DL), and because the amount of control bits per TTI is the same for all packet sizes. For example, for each transport block (TB) that is transmitted on an E-DCH, an acknowledge/non-acknowledge (ACK/NACK) is transmitted in the DL and the enhanced transport format combination indicator (E-TFCI), in a robust secure network (RSN), and a 'Happy bit' is transmitted in the UL. It is possible to reduce the control overhead by transmitting more packets in the same transport block but less often. However, the payload in the TB and the TTI would be increased.

Preferably, the UTRAN could increase the transmission interval for specific services (e.g. voice over Internet protocol (VoIP)) in the UTRAN in order to increase transmission capacity. Here, the UTRAN should take into account the characteristics of the service, e.g. an assumed or known bit rate, delay requirement, possibly known service data unit (SDU) arrival rates, etc, when defining the transmission interval.

For example, according to rules set forth in chapter 5.1.1. of TS 26.236, in the case of 3GPP adaptive multi-rate (AMR) and AMR-Wideband (WB) codecs in conversational voice over Internet protocol (VoIP) connections, there is one user datagram protocol/real-time transport protocol/Internet protocol (UDP/RTP/IP) packet per speech frame, i.e., one packet in 20 ms. On E-DCH, this leads to a rate of one transport block (TB) transmission per 20 ms because the current MAC specification requires the UE to maximize the throughput of the highest priority data. Speech is typically high priority and thus, MAC tries to send the speech packet as soon as possible when received from the higher layers. However, the service tolerates some additional delay in the radio interface. As a result, the packets could be sent once in every 40 or 60 ms in order to improve transmission capacity. Here, it is possible to assume the additional transmission delay of 20 to 40 ms has an unnoticeable impact in the speech quality.

SUMMARY OF THE INVENTION

The present invention relates to enhancing the uplink dedicated channel (E-DCH) for packet data traffic during Third Generation Partnership Project (3GPP) High Speed Uplink Packet Access (HSUPA), the 3GPP TR 25.808, specification "frequency division duplex (FDD) Enhanced Uplink; Physical Layer Aspects" and during the 3GPP TS 25.309, "Frequency Division Duplex (FDD) Enhanced Uplink; Overall description; Stage 2".

In accordance with the invention, a control parameter that is independent from an air interface transmission time interval (TTI), hybrid automatic repeat request (HARM) processes or enhanced dedicated transport channel (E-DCH) scheduling is used. This control defines the minimum time interval between subsequent new transmissions. The control has no impact on retransmissions, which are performed normally.

For every MAC-e PDU, a check is made to determine whether the transmission is autonomous. If the transmission is not autonomous, a check is continually performed until an autonomous transmission occurs. That is, a continuous loop is performed. If an autonomous transmission is detected, then the exchange rate between the MAC-e and the physical layer (layer one) is slowed down, i.e. the exchange rate is decelerated. In accordance with the present invention, the slow down of the exchange rate between the MAC-e and the physical layer occurs when the MAC-e layer, i.e., the sub-layer of Layer Two sends a MAC-e PDU to the Layer One (i.e., the physical layer). The MAC-e PDU is sent to the physical layer every n*TTI, instead of once every transmission time interval (TTI).

Alternatively, the rate at which the MAC-e sends protocol data units (PDUs) to the physical layer for the transport format (TF(s)) belonging to a minimum set is decelerated so as to reduce the impact of the minimum set over a "Rise over Thermal" (RoT). For each user equipment (UE), the minimum set defines a set of transport formats (TFs) for which a valid scheduling grant is not required in order for packets to be transmitted. In normal conditions, a Node B (i.e., a base station) allocates a share of an uplink resource to the UE via a scheduling grant. From the perspective of layer one, the method of the invention is transparent, i.e., it appears that packets are only sent occasionally (e.g. once in a while).

As the value of n is increased, the effective bit rate and the impact of the autonomous transmission on the RoT become smaller. In accordance with the present invention, synchronous HARQ is used. As a result, it becomes possible to always use the same hybrid automatic repeat request (HARQ) process if n is selected as a multiple of the number of HARQ processes. In addition, different HARQ processes can be used based on a different value of n. Here, the value of n may be selected by specification, signaled to UEs (i.e., a common value is signaled to the UEs) or UE dependant (i.e., a specific value that is signaled to a specific UE). The method of the invention is advantageously simpler than conventional methods for performing scheduling grants for scheduled transmissions. Moreover, the present invention is transparent to Layer One, and provides a minimum impact on Layer Two.

In an embodiment of the invention, a new control parameter is implemented in either a packet data protocol (PDP) context/radio access bearer (RAB) layer or in the MAC layer. When the invention is implemented in the PDP context/radio access RAB layer, a new PDP context/quality of service (QoS) parameter is used. In the preferred embodiment, the new parameter is a "service data unit (SDU) inter-arrival rate" that establishes the minimum required time interval between consecutive SDUs that are transmitted on a specific RAB. In accordance with the present embodiment, the parameter is signaled in different interfaces than the existing PDP context/RAB QoS parameters. As a result, the application does not deliver SDUs to the MAC layer at a higher rate than the rate specified by the parameter. If the data source produces several packets within this time interval, the packets are grouped into a single SDU. Grouping the packets in the MAC layer provides the ability to obtain the benefits associated with optimizing the packet header overhead, such as more efficiently sharing the uplink power resource between packet data users.

Alternatively, it is possible to introduce a new MAC parameter in the MAC-d layer. In the preferred embodiment, the new parameter is a "virtual TTI" that defines the minimum time interval between subsequent new transmissions for a MAC-d flow. A first transmission would be permitted only once, during the virtual TTI. The virtual TTI could be signaled to the UE by the radio network controller (RNC). The UE could then implement the virtual TTI in the MAC-d layer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are merely intended to conceptually illustrate the structures and procedures described herein.

BRIEF DESCRIPTION OF THE DRAWING

The foregoing and other advantages and features of the invention will become more apparent from the detailed description of the preferred embodiments of the invention given below with reference to the accompanying drawing in which.

Figure 7:
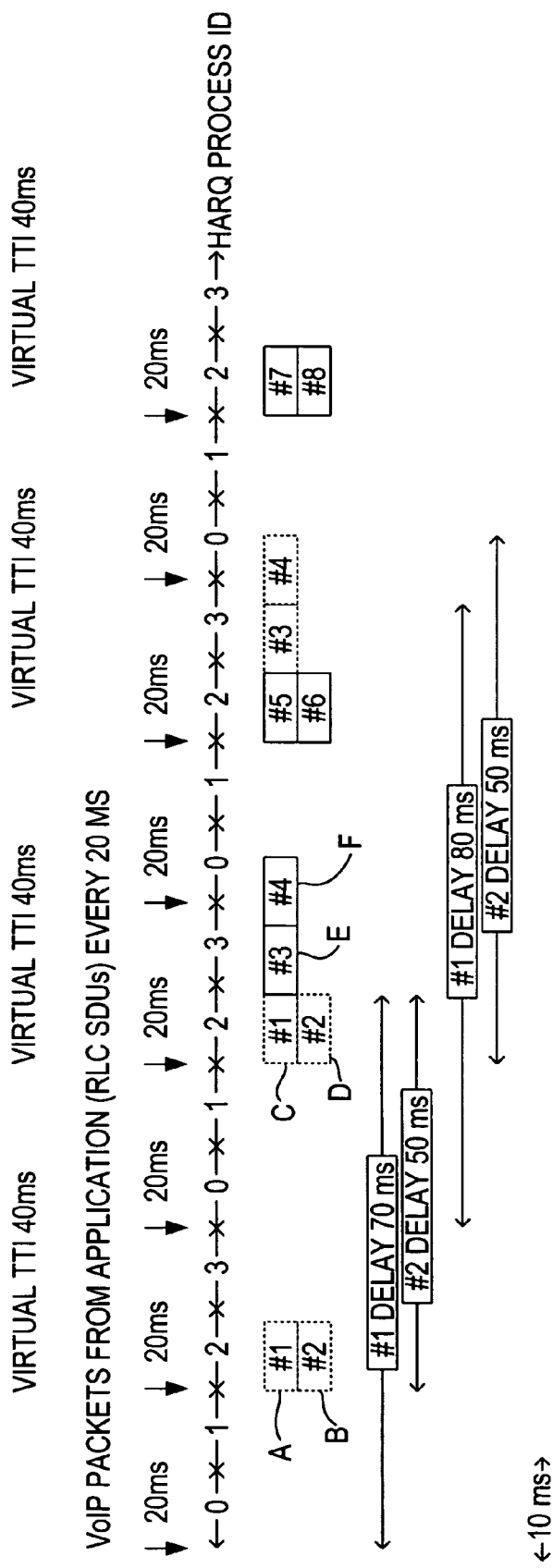

FIGS. 5 and 6 are exemplary timing diagrams associated with the introduction of a new medium access control (MAC) parameter can be introduced in the medium access control dedicated (MAC-d) layer in accordance with an embodiment of the invention for a 10 ms and 2 ms transmission time interval, respectively; and FIG. 7 is an exemplary timing diagram associated with the embodiment of FIG. 5 in accordance with an alternative embodiment of the invention.

DETAILED DESCRIPTION OF THE EXEMPLARY EMBODIMENTS

The present invention relates to a system and methods for slow medium access control entity (MAC-e) for autonomous transmission in HSUPA, along with service specific transmission time control. In accordance with the invention, a control parameter that is independent from the air interface transmission time interval (TTI), hybrid automatic repeat request (HARQ) processes or enhanced dedicated transport channel (E-DCH) scheduling is used. This control defines the minimum time interval between subsequent new transmissions. The control has no impact on retransmissions, which are performed normally.

Figure 1:
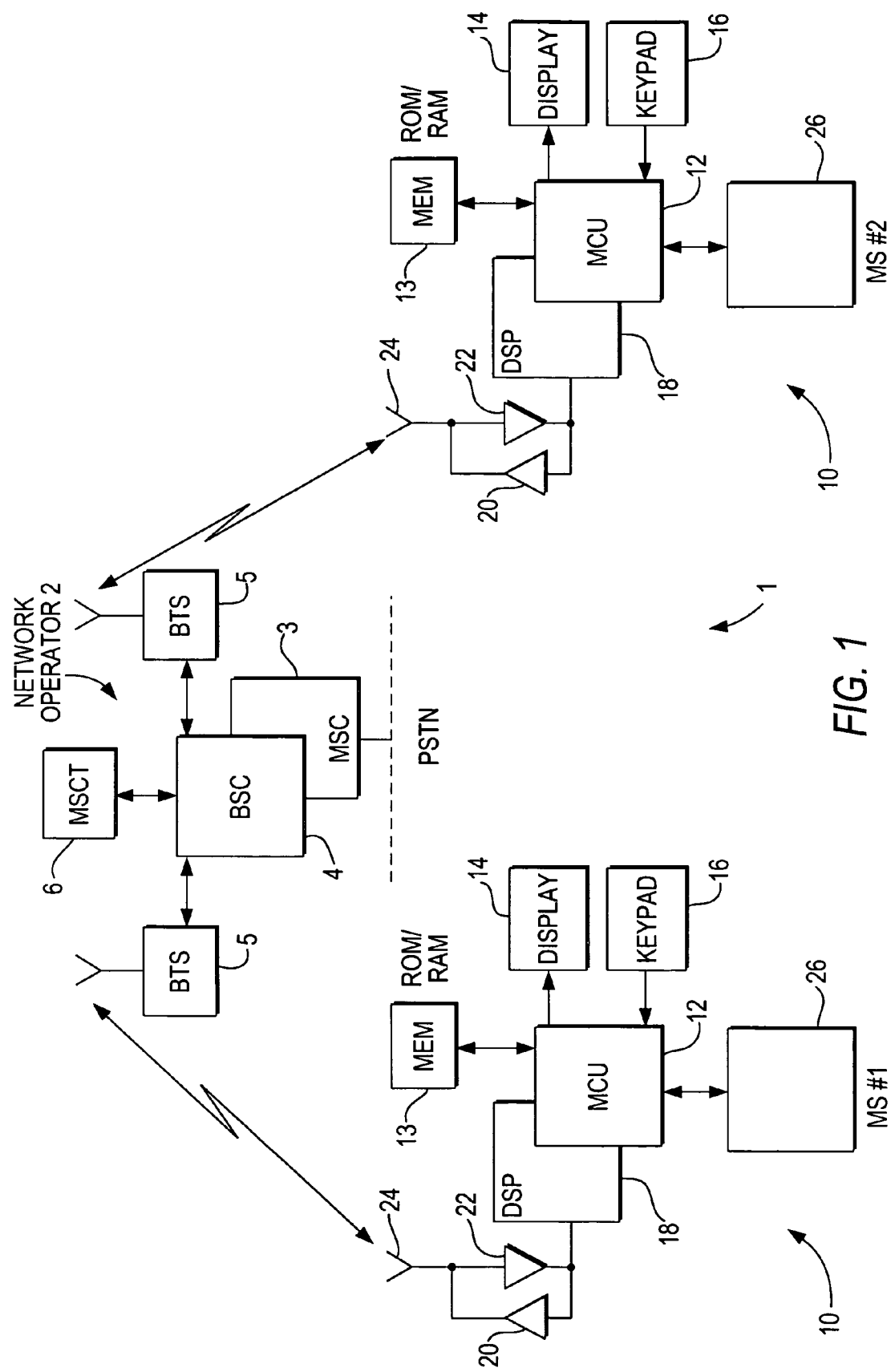
FIG. 1 is an exemplary block diagram of a wireless communication system in which the method of the invention is implemented.

FIG. 1 shows an exemplary network operator 2 having, for example, a mobile switching center (MSC) 3 for connecting to a telecommunications network, such as the Public Switched Telephone Network (PSTN), at least one base station controller (BSC) 4, and a plurality of base transceiver stations (BTS) 5 that transmit in a forward or downlink direction both physical and logical channels to the mobile stations 10 in accordance with a predetermined air interface standard. It is assumed that a reverse or uplink communication path exists from the mobile station 10 to the network operator, which conveys mobile originated access requests and traffic, as well as signaling for implementing the invention. The BTSs 5 define cells, which can be different sizes, different frequencies and so forth.

The air interface standard may conform to a Time Division Multiple Access (TDMA) air interface, and the network may be a Universal Mobile Telecommunications System (UMTS) network or other type of network. However, the teachings of the present invention apply equally to Code Division Multiple Access (CDMA) networks, as well as to other network types.

The network operator 2 can include a Message Service Center (MSCT) 6 that receives and forwards messages for the MS 10, such as Short Message Service (SMS) messages, or any wireless messaging technique including e-mail and Supplementary Data Services. Furthermore, enhancements to SMS can be used, such as one under development and known as Multimedia Messaging Service (MMS), wherein image messages, video messages, audio messages, text messages, executables and the like, and combinations thereof, can be transferred between a network and a mobile station.

The mobile station (MS) 10 typically includes a microcontrol unit (MCU) 12 having an output coupled to an input of a display 14 and an input coupled to an output of a keyboard or keypad 16. The MS 10 may be considered a handheld radiotelephone, such as a cellular, mobile telephone or a personal digital assistant (PDA), and may have a microphone and a speaker (not shown) for conducting voice communications. The MS 10 could also be contained within a card or module that is connected during use to another device. For example, the MS 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received data packets and data packets prepared for transmission, etc. The memory 13 is assumed to store the various parameters that are used by the MS 10 for performing cell reselection.

A separate, removable SIM (not shown) can be also be provided, the SIM storing, for example, a preferred Public Land Mobile Network (PLMN) list and other subscriber-related information. The ROM is assumed, for the purposes of this invention, to store a program enabling the MCU 12 to execute the software routines required to operate in accordance with the presently preferred embodiments of the present invention.

The MS 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator 2. The receiver 22 is used for making signal measurements used in the cell reselection process.

In conventional system architectures, packet schedulers are located in the Radio Network Controller (RNC) (not shown). In addition, the Radio Resource Control (RRC) signaling interface between the RNC and the user equipment (UE) has bandwidth constraints. As a result, the packet scheduler is limited in its ability to adapt to instantaneous traffic changes. Hence, to accommodate this variation in network traffic, the packet scheduler must conservatively allocate uplink power to take into account the influence from inactive users during a subsequent scheduling period. However, this solution is spectrally inefficient for high allocated data-rates and long-release timer values.

Along with enhanced dedicated channel (E-DCH), the present invention utilizes the Node B (i.e., the base station) to handle the allocation of uplink resources, i.e. it performs Node B scheduling. Here, the UE selects a transport format combination (TFC) that is optimal for the amount of data to be transmitted in the radio link control (RLC) buffer of the UE in order to transmit data. However, the selection of the TFC is subject to constraints on the maximum transmission power of the UE and the maximum allowed TFC. However, if needed, the UE can request a higher bit rate, and the Node B will then decide whether to grant additional resources. In certain embodiments, the Node B may adjust the resources allocated to all UEs based on the current cell load.

Figure 2:
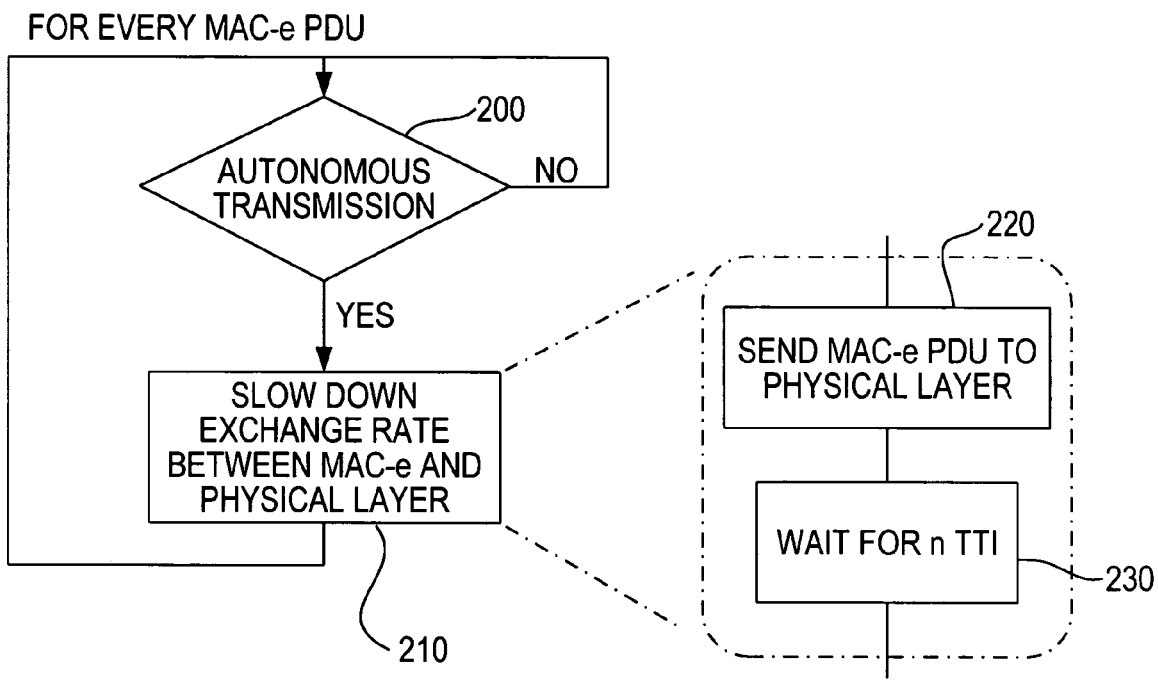
FIG. 2 is an exemplary flow chart illustrating the steps of the method of the invention in accordance with an embodiment of the invention.

FIG. 2 is an illustration of the steps associated with the method of the present invention. For every MAC-e PDU, a check is made to determine whether the transmission is autonomous, as indicated in step 200. If the transmission is not autonomous, a check is continually performed until an autonomous transmission occurs, that is the method continues in a loop. If an autonomous transmission is detected, then the exchange rate between the MAC-e and the physical layer (layer one) is slowed down, i.e. the exchange rate is decelerated, as indicated in step 210. In accordance with the invention, the slow down of the exchange rate between the MAC-e and the physical layer occurs when the MAC-e layer, i.e., the sub-layer of Layer Two as described in the 3GPP IS 25. 309 specification, "frequency division duplex (FDD) Enhanced Uplink; Overall description; Stage 2", sends a MAC-e PDU to the layer one (i.e., the physical layer), as indicated in step 220. The MAC-e PDU is sent to the physical layer every n*TTI, instead of once every transmission time interval (TTI), as indicated in step 230.

Alternatively, the rate at which the MAC-e sends protocol data units (PDUs) to the physical layer for the transport format (TF(s)) belonging to a minimum set is decelerated so as to reduce the impact of the minimum set over a "Rise over Thermal" (RoT). For each user equipment (UE), the minimum set defines a set of transport formats (TFs) for which a valid scheduling grant is not required in order for packets to be transmitted. In normal conditions, the Node B allocates a share of an uplink resource to the UE via a scheduling grant. From the perspective of layer one, the method of the invention is transparent, i.e., it appears that packets are only sent occasionally (e.g. once in a while).

As the value of n is increased, the effective bit rate and the impact of the autonomous transmission on the RoT become smaller. In accordance with the present invention, synchronous HARQ as defined in the 3FPP TR 25.808, specification "frequency division duplex (FDD) Enhanced Uplink; Physical Layer Aspects" is used. As a result, it becomes possible to always use the same hybrid automatic repeat request (HARQ) process if n is selected as a multiple of the number of HARQ processes. In addition, different HARQ processes can be used based on a different value of n. Here, the value of n may be selected by specification, signaled to UEs (i.e., a common value is signaled to the UEs) or UE dependant (i.e., a specific value that is signaled to a specific UE). The method of the invention is advantageously simpler than conventional methods for performing scheduling grants for scheduled transmissions. Moreover, the present invention is transparent to Layer One, and provides a minimum impact on Layer Two.

In an embodiment of the present invention, the method of the invention is implemented as a new control parameter in either a packet data protocol (PDP) context/radio access bearer (RAB) layer or in the MAC layer. When the invention is implemented in the PDP context/radio access RAB layer, a new PDP context/quality of service (QoS) parameter is used. In the preferred embodiment, the new parameter is a "service data unit (SDU) inter-arrival rate" that establishes the minimum required time interval between consecutive SDUs that are transmitted on a specific RAB. In accordance with the present invention, the parameter is signaled in different interfaces than the existing PDP context/RAB QoS parameters. As a result, the application does not deliver SDUs to the MAC layer at a higher rate than the rate specified by the parameter. If the data source produces several packets within this time interval, the packets are grouped into a single SDU. Grouping the packets in the MAC layer provides the ability to obtain the benefits associated with optimizing the packet header overhead, such as more efficiently sharing the uplink power resource between packet data users.

Figure 3:
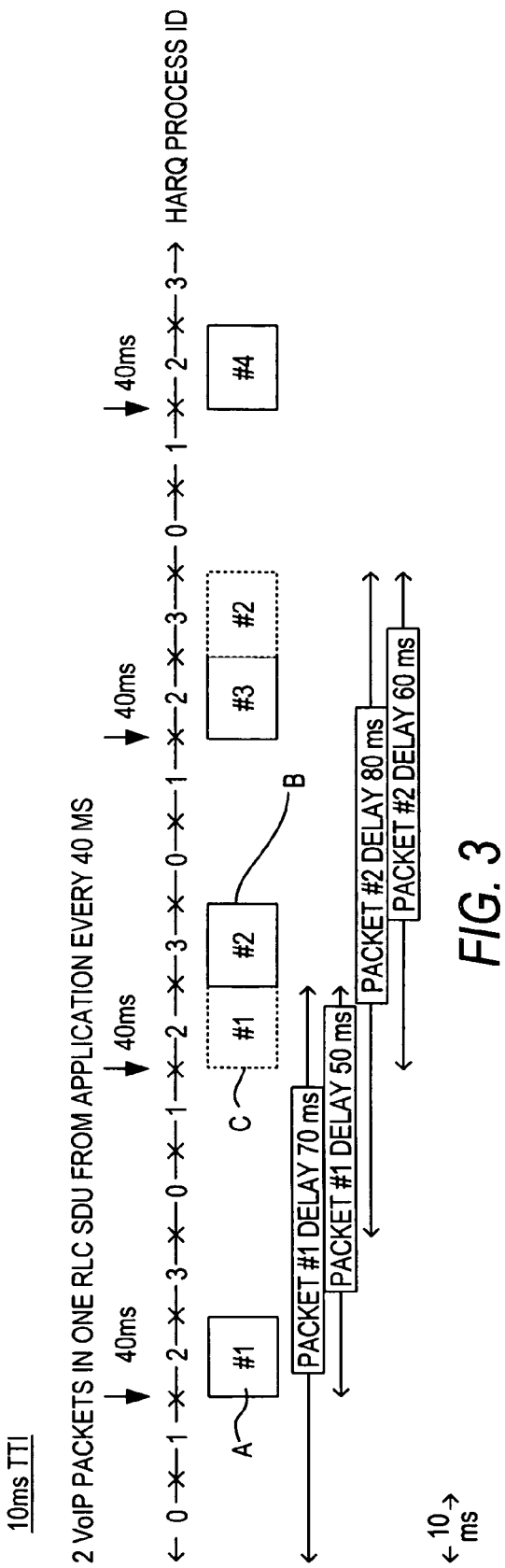
FIGS. 3 and 4 are exemplary timing diagrams associated with the introduction of a packet data protocol (PDP) context/ radio access bearer (RAB) Quality of Service (QoS) parameter in the PDP context/RAB layer in accordance with an embodiment of the invention for a 10 ms and 2 ms transmission time interval (TTI), respectively.
Figure 4:
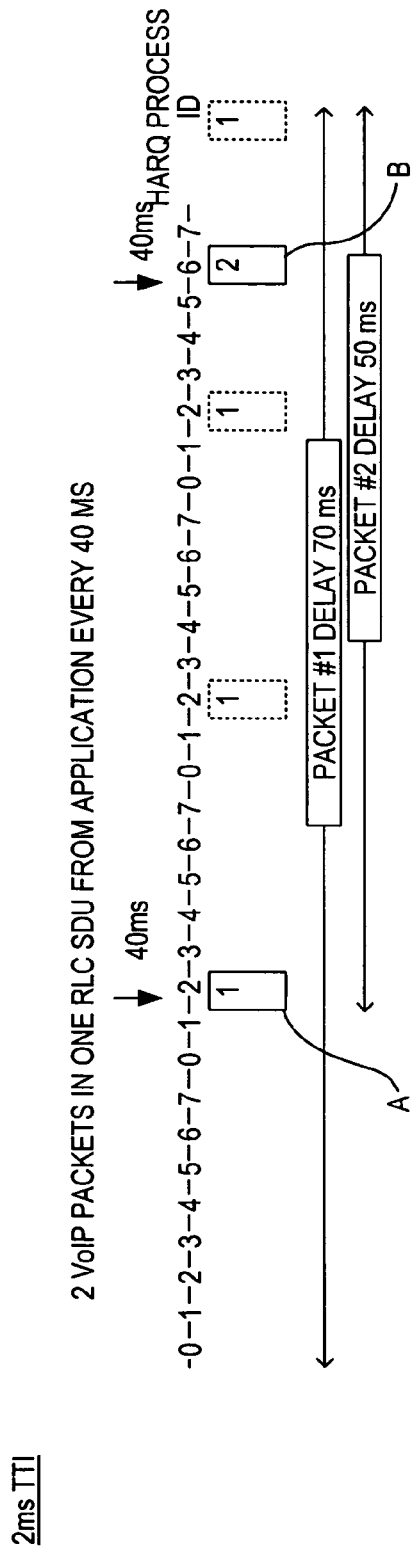

When larger sized SDUs are used instead of more frequently transmitted smaller sized SDUs, it becomes possible to decrease the processing load in the UE, the core network and the radio access network. However, it may not always be possible to consider the SDU inter-arrival rate parameter and perform such a grouping within the application layer, depending on how transparent the radio network is to the application layer. FIGS. 3 and 4 are exemplary timing diagrams associated with the introduction of a packet data protocol (PDP) context/radio access bearer (RAB) Quality of Signal (QoS) parameter in the PDP context/RAB layer in accordance with an embodiment of the invention for a 10 ms and 2 ms air interface transmission time interval (TTI), respectively. In each case, the SDU inter-arrival rate is 40 ms.

With reference to FIG. 3, for a 10 ms air interface TTI of 10 ms, 2 VoIP packets (i.e., 1 RLC SDU) are transmitted every 40 ms. In this case, a single VoIP packet is transmitted from the source every 20 ms. That is, the data source produces several (i.e. two) data packets within the 40 ms SDU inter-arrival rate that are grouped into the single SDU. One retransmission is shown for RLC SDUs #1 and #2, both containing 2 VoIP packets. The SDU inter-arrival rate of 40 ms ensures that the subsequent new RLC SDU #2 (B) will be transmitted after a delay of at least 40 ms after the RLC SDU #1 (A), and that the 2 VoIP packets produced by the source during the 40 ms period are grouped into single RLC SDU #2 (B). Due to retransmission (C) of the RLC SDU #1 (A), the delay for the first generated packet in the RLC SDU #1 (A) is 70 ms and the delay for the packet in the RLC SDU #1 (A) that is subsequently generated 20 ms later is 50 ms, i.e., both packets in the single RLC SDU are retransmitted. Here, a retransmission of RLC SDU #2 (B) has also occurred. As a result, the 2 VoIP packets in B are delayed 80 ms and 60 ms, where the additional one air interface TTI (10 ms) delay is due to the retransmission (C) of the RLC SDU #1 (A) occurring when the RLC SDU #2 (B) would first be allowed. In accordance with the contemplated embodiments, a packet refers to a VoIP packet from the source (e.g., voice codec) and the numbers with the boxes (A, B) refers to RLC SDU numbers. As shown in FIG. 4 for a 2 ms air interface TTI, there is no additional delay for the RLC SDU #2 (B) due to retransmissions of RLC SDU #1 (A), and the RLC SDU #2 (B) is transmitted 40 ms later than RLC SDU #1 (A) since the retransmissions RLC SDU #1 (A) occur in different HARQ processes than the transmission of RLC SDU #2 (B). Due to 3 retransmissions of the RLC SDU #1 (A), the delay for the first generated packet in the RLC SDU #1 (A) is 70 ms and the delay for the VoIP packet in the RLC SDU #1 (A) that is subsequently generated 20 ms later is 50 ms, i.e., both packets in the single RLC SDU are retransmitted 3 times.

The preferred transmission interval would be an optimization for radio access network purposes and depends on, for example, the transport channel that is used. Consequently, the PDP context/RAB QoS parameter may not be the best place in which to define the transmission interval. Alternatively, it is possible to introduce a new MAC parameter in the MAC-d layer. In the preferred embodiment, the new parameter is a "virtual TTI" that defines the minimum time interval between subsequent new transmissions for a MAC-d flow. A first transmission would be permitted only once, during the virtual TTI. The virtual TTI could be signaled to the UE by the radio network controller (RNC). The UE could then implement the virtual TTI in the MAC-d layer.

With reference to FIG. 5, for a 10 ms air interface and a TTI of 10 ms, VoIP packets are transmitted every 20 ms. With a 40 ms virtual TTI in MAC-d, 2 VoIP packets are transmitted in the same air interface TTI every 40 ms. In this case, a single packet is transmitted from the source every 20 ms and each RLC SDU contains one VoIP packet. That is, RLC SDUs, each containing a single VoIP packet, are delivered from the application to MAC every 20 ms. Here, packets #1 (A) and packets #2 (B) are delivered to MAC layer in their own separate RLC SDUs with a 20 ms time difference, and grouped at MAC-d layer for transmittal in the same single 10 ms air interface TTI.

The subsequent new packets #3 and #4 are grouped together in MAC-d for transmittal in the same 10 ms air interface TTI, because the 40 ms virtual TTI prevents this transmission before 40 ms after the start of the previous transmission has elapsed. The packets #1 (A) and #2 (B) are retransmitted (C and D). The packet #1 (A) is transmitted from the source 20 ms earlier than packet #2 (B), but is not allowed to be transmitted before the 40 ms virtual TTI has elapsed after the start of the previous packet first transmission. As a result, the delay for the packet #1 (A) with one retransmission (C) is 70 ms and the delay for the packet #2 (B) with one retransmission (D) is 50 ms.

Here, a retransmission of packets #1 (A) and #2 (B) has occurred. As a result, packet #3 (E) is delayed 80 ms and packet #4 (F) is delayed 60 ms, where the additional one air interface TTI (i.e., 10 ms) delay, in comparison to packets #1 (A) and #2 (B) with the same number of retransmissions, is due to the retransmissions of the packets #1 (A) and #2 (B) occurring when the transmission of the packets #3 (C) and #4 (D) would first be allowed. In accordance with the contemplated embodiments, a packet refers to a VoIP packet from the source (e.g., voice codec) and the numbers with the boxes (A, B, C, D) refers to both packet and RLC SDU numbers.

In FIG. 6, for a 2 ms air interface TTI, packets #1 (A) and #2 (B) are transmitted in the same 2 ms air interface TTI and are retransmitted 3 times. The delay for packet #1 (A) is 70 ms and the delay for packet #2 (B) is 50 ms. Here, the first transmission for the packet #1 (A) is allowed only 40 ms later than the previous packet first transmission and is thus, delayed an additional 20 ms in comparison to packet #2 (B) that can be transmitted without additional delay. The packets #3 (C) and #4 (D) are transmitted at the 40 ms virtual TTI later than the first transmission of the packets #1 (A) and #2 (B).

Additionally, it is possible to take into account the "virtual TTI" in the application layer to optimize the protocol header overhead, as discussed below. Defining the parameter in the MAC layer advantageously supports the elimination of the dependency on the radio access network, as compared to the case where the transmission interval is defined in the PDP context/RAB parameter. If several radio bearers (RB) are multiplexed into the same transport channel, it should be possible to separately define a "virtual TTI" for each RB.

In the latter case, the RNC uses the parameters delivered by the serving general packet radio service (GPRS) support node (SGSN) to identify the specific services. It should be noted, however, the control (i.e., the calculated delay) is not based on the specific service, but rather the delay is based on the QoS parameters of the service. In addition, other available information can be used to determine the most optimal virtual TTI length. For example, the QoS values such as "source statistics descriptor" (SSD), "traffic class", and "transfer delay" can be used to calculate the delay. In certain embodiments of the invention, if SSD has value indicative of "speech" and the traffic class is conversational, then the virtual TTI is determined to be 40 ms. In addition, the load in the radio access network (RAN) can be included as another criterion for determining the most optimal virtual TTI length. In this case, the lower the load level, the shorter the virtual TTI that is used. The present invention is not to be limited to the examples based on the QoS and the like, i.e., the general approach regarding RNC algorithms in 3GPP. It is to be appreciated that other specific implementations are possible, which are based on specific RNC algorithms as required be each specific implementation.

In the downlink direction (DL), the invention is implemented in a high speed downlink shared transport channel (HS-DSCH). Here, the RAB attribute 'SDU inter-arrival rate' in the DL would permit the UTRAN to optimize its DL resources. In addition, the UTRAN is permitted to determine whether to use a 'virtual TTI' in the DL in the MAC layer. The advantage of signaling the 'virtual TTI' to the UE in the DL is that the UE can switch the receiver off during the inter-arrival period, even though it is possible to provide this functionality in the DL without signaling it to the UE. As a result, an alternative periodicity parameter T can be used to define the HS-SCCH decoding period instead of the HS-DSCH decoding period.

The radio network controller (RNC) and base station (i.e., Node B), as defined in the current 3GPP specified network are exemplary. Therefore, the present invention is not to be limited to such a device. Rather, the present invention may be implemented in other packet switched (PS) networks, e.g., in an evolved 3GPP network depending on their frame structure and flexibility of the structure.

In an alternative embodiment of the present invention, the UE decides whether to use a 40 ms virtual TTI when it detects that the underlying RAN network is HSUPA. i.e., signalling of the parameters (i.e., the transmission interval) is not performed by the network, but is implemented internally in the UE. In accordance with the present embodiment, the UE may decide to use the 40 ms virtual TTI when it detects that the underlying RAN network is HSUPA.

In another embodiment of the present invention, the virtual TTI is signalled by the network, and used on the MAC level as describe above. In addition, the information pertaining to the virtual TTI is conveyed to a unit that controls the packetization of packets from the data source into SDUs, for example, packetization of speech frames (in real-time transport protocol (RTP) payload). In accordance with the present embodiment, based on the length of the virtual TTI, it is possible to modify the packetizing rules so as to optimise the speech connection to the virtual TTI. For example, in the default operation, one 20 ms speech frame is placed into one user datagram protocol/real-time transport protocol/Internet protocol (UDP/RTP/IP) packet. If the virtual TTI is known to have a length of 40 ms, it is possible to insert two 20 ms frames into one UDP/RTP/IP packet and thus, reduce the UDP/RTP/IP protocol overhead and processing load in UE and the network.

A single speech packet per radio link control (RLC) service data unit (SDU) or UDP/RTP/IP packet potentially provides a greater level of flexibility than embodiments of the invention in which several speech packets are combined into one RTP/UDP/IP packet. For example, if the downlink portion of a call uses high-speed downlink packet access (HSDPA) that has different speech packets in separate RLC SDUs, then a greater level of flexibility is provided for the HSDPA scheduler. In addition, for high speed uplink access (HSUPA), each speech packet in separate RLC SDUs permits the sending of only one speech packet per air interface TTI of 2 ms or 10 ms. This would be the case if, e.g., the transmission of higher priority packets from another radio link control (RLC) buffer, such as the signalling radio bearer (SRB), prohibits the transmittal of large transport block (TB) that contains several speech packets. Moreover, the size of the RLC SDU is more regular and predictable if only one speech frame is included into one RLC SDU.

In accordance with the present contemplated embodiments, the UE power limitations in bad radio conditions, such as the UE running out of transmission power, are taken into account so that it then becomes possible to send a single speech packet per air interface TTI of 2 ms or 10 ms. Here, the MAC-d would check the RLC buffer of the UE once per virtual TTI, i.e., at the same interval as a normal TTI as defined in the 3GPP IS 25. 309 specification. As a result, packets received during the virtual TTI would be buffered at the RLC level. In addition, the MAC is permitted to check the RLC buffer more frequently in certain special cases, such as when it is not possible to clear the RLC buffer due to power limitations, the transmission of higher priority packets from other RLC buffer (e.g. SRB) or if there are bigger RLC SDUs (e.g., non-compressed headers or real time control protocol (RTCP) packets) that cannot be transmitted within one air interface TTI.

With reference to FIG. 7, for a 10 ms air interface and a virtual TTI of 40 ms, two VoIP packets are transmitted every 40 ms. Here, packets #1 (A) and packets #2 (B) are grouped together into a single SDU since the subsequent new packet #2 (B) is transmitted within the 40 ms time period. A single transmission for packets #1 (C) and #2 (D) and #3 (E) and #4 (F) is shown. However, it is not possible to transmit subsequent new packets #3(E) and #4 (F) during a single TTI. As a result, these packets are grouped together and transmitted in separate TTIs.

Examples of the operation of the UE MAC under such conditions are as follows: (i) if the MAC is able to empty the RLC buffer during this air interface TTI, then the MAC will check the RLC buffer at the next predetermined subsequent time interval after the virtual TTI; (ii) if the MAC is not able to empty the buffer, then the MAC will also check the RLC buffer for the next air interface TTI. This permits rapid clearing of the RLC buffers when required, i.e., when large SDUs are utilized. However, the frequency of transmissions during normal operation remains limited. In certain embodiments, the implementation of the present contemplated embodiment is permitted based on the configuration of the network, e.g., the network is configured to restrict the transmissions only to instances of times that are established by the virtual TTI or the network is configured to permit the above previously described operations.

Conventional systems and methods require either limiting the number of available HARQ processes or the scheduling of scheduled transmissions. With the conventional TTI, the transmission interval can be limited only up to 10 ms, and the TTI will impact all the MAC-d flows and all the services. Therefore, limiting the TTI is not a viable service specific solution per se. Limiting the available HARQ processes has the negative impact of eliminating the flexibility associated with HARQ process handling in multi-service cases. In the case of packet re-transmissions, the number of available HARQ processes should be increased. If this increase does not occur, the transmission interval for new transmissions will become increased from what was originally intended. In case of a 2 ms TTI, the transmission can be limited by controlling HARQ processes only up to every 16 ms, and in case of a 10 ms TTI up to 40 ms. It is also possible to control the TTI of scheduled transmissions by scheduling. However, this introduces large control overhead, i.e., two scheduled grants per single transmission occur.

The present invention advantageously conserves control overhead. Specifically, the downlink E-DCH HARQ Indicator Channel (HICH) (i.e., the HARQ ACK/NAK is sent on E-HICH) overhead can be reduced because ACK/NACKs are needed less frequently. Also, the E-DCH dedicated physical control channel (E-DPCCH) overhead is reduced. In addition, a further savings in overhead is possible if the uplink dedicated physical control channel (UL DPCCH) gating is introduced. In this case, the DPCCH is not transmitted continuously but only when other UL channels are transmitted. In addition to the savings in system capacity, another advantage of the present invention is that battery power of the UE is conserved, since the UE needs to transmit and receive less often when a virtual TTI is used.

While there have shown and described and pointed out fundamental novel features of the invention as applied to presently preferred embodiments thereof, it will be understood that various omissions and substitutions and changes in the form and details of the components illustrated, and in their operation may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A method comprising:
   determining a virtual transmission time interval for a medium access control entity of an apparatus;
   checking to determine whether the medium access control entity is transmitting data packets from the apparatus in a current air interface transmission time interval; and
   for the case where it is determined that the medium access control entity is not transmitting from the apparatus in the current air interface transmission time interval, transmitting a next data packet from the apparatus after a predetermined period associated with the virtual transmission time interval has elapsed, wherein the next data packet comprises at least one protocol data unit and the virtual transmission time interval is an integer multiple of the current air interface transmission time interval.

2. The method of claim 1, wherein the virtual transmission time interval comprises a minimum time interval that is allowed between uplink transmissions.

3. The method of claim 1, wherein checking to determine whether the medium access control entity is transmitting data packets in a current air interface transmission time interval comprises checking to determine if the medium access control entity emptied its radio link control buffer.

4. The method of claim 3, wherein transmitting comprises transmitting the at least one protocol data unit from the buffer.

5. The method of claim 4, wherein transmitting the at least one protocol data unit comprises selecting a transport format combination as a function of the virtual transmission time interval.

6. The method of claim 5, wherein selecting the transport format combination is a function of occupancy of the radio link control buffer and the virtual transmission time interval.

7. The method of claim 4, wherein transmitting the at least one protocol data unit comprises transmitting it over a dedicated channel.

8. The method of claim 1, wherein determining the virtual transmission time interval comprises receiving from a network element the virtual transmission time interval.

9. The method of claim 1, wherein determining the virtual transmission time interval is without explicit network signaling.

10. The method of claim 1, executed by a mobile station for autonomous uplink transmission in which a scheduling grant from a network is not required.

11. A memory embodying a computer program executable by a processor for performing actions directed toward changing a transmission interval, said actions comprising:
   determining a virtual transmission time interval for a medium access control entity;
   checking to determine whether the medium access control entity is transmitting data packets in a current air interface transmission time interval; and
   for the case where it is determined that the medium access control entity is not transmitting in the current air interface transmission time interval, transmitting a next data packet after a predetermined period associated with the virtual transmission time interval has elapsed, wherein the next data packet comprises at least one protocol data unit and the virtual transmission time interval is an integer multiple of the current air interface transmission time interval.

12. The memory of claim 11, wherein the virtual transmission time interval comprises a minimum time interval that is allowed between uplink transmissions.

13. The memory of claim 11, wherein checking to determine whether the medium access control entity is transmitting data packets in a current air interface transmission time interval comprises checking to determine if the medium access control entity emptied its radio link control buffer.

14. The memory of claim 13, wherein transmitting comprises transmitting the at least one protocol data unit from the buffer.

15. The memory of claim 14, wherein transmitting the at least one protocol data unit comprises selecting a transport format combination as a function of the virtual transmission time interval.

16. The memory of claim 15, wherein selecting the transport format combination is a function of occupancy of the radio link control buffer and the virtual transmission time interval.

17. The memory of claim 14, wherein transmitting the at least one protocol data unit comprises transmitting it over a dedicated channel.

18. The memory of claim 11, wherein determining the virtual transmission time interval comprises receiving from a network element the virtual transmission time interval.

19. The memory of claim 11, wherein determining the virtual transmission time interval is without explicit network signaling.

20. The memory of claim 11, wherein the memory and the processor are disposed in a mobile station, and the actions are for autonomous uplink transmission in which a scheduling grant from a network is not required.

21. An apparatus comprising:
a memory adapted to store computer program instructions and a virtual transmission time interval;
a wireless transceiver;
a processor adapted to:
check to determine whether the apparatus is transmitting data packets in a current air interface transmission time interval; and
for the case where it is determined that the apparatus is not transmitting in the current air interface transmission time interval, to cause the transmitter to transmit a next data packet after a predetermined period associated with the virtual transmission time interval has elapsed, wherein the next data packet comprises at least one protocol data unit and the virtual transmission time interval is an integer multiple of the current air interface transmission time interval.

22. The apparatus of claim 21, wherein the virtual transmission time interval comprises a minimum time interval that is allowed between uplink transmissions.

23. The apparatus of claim 21, further comprising a radio link control buffer coupled to the wireless transceiver, and wherein the check to determine whether the mobile station is transmitting data packets in a current air interface transmission time interval comprises a check to determine if the radio link control buffer is empty.

24. The apparatus of claim 23, wherein the next data packet comprises the at least one protocol data unit sent from the buffer to the transceiver.

25. The apparatus of claim 21, wherein for the case where the processor is adapted to cause the transceiver to transmit the at least one protocol data unit, the processor is further adapted to select a transport format combination for the at least one protocol data unit as a function of the virtual transmission time interval.

26. The apparatus of claim 25, wherein the transport format combination is a function of occupancy of the radio link control buffer and the virtual transmission time interval.

27. The apparatus of claim 21, wherein the transmitter is adapted to transmit the next data packet over a dedicated channel.

28. The apparatus of claim 21, wherein the virtual transmission time interval is received from a network element via the wireless transceiver.

29. The apparatus of claim 21, wherein the virtual transmission time interval is determined by the processor without explicit network signaling.

30. The apparatus of claim 21, wherein the virtual transmission time interval is used for autonomous uplink transmission in which a scheduling grant from a network is not required.

31. The apparatus of claim 21, wherein the apparatus comprises a mobile station.

32. An apparatus comprising:
means for determining a virtual transmission time interval for a medium access control entity;
means for checking to determine whether the medium access control entity is transmitting data packets in a current air interface transmission time interval; and
for the case where it is determined that the medium access control entity is not transmitting in the current air interface transmission time interval, means for transmitting a next data packet after a predetermined period associated with the virtual transmission time interval has elapsed, wherein the apparatus comprises a mobile station, and the virtual transmission time interval is an integer multiple of the current air interface transmission time interval.

33. The apparatus of claim 32, wherein:
the means for determining comprises a wireless receiver configured to receive a message from a network entity that includes the virtual transmission time interval;
the means for checking comprises a processor adapted to determine whether a radio link control buffer is empty; and
the means for transmitting comprises a wireless transmitter coupled to the processor and configured to transmit a protocol data unit only after it is determined that the period determined by the virtual transmission time interval has elapsed.

* * * * *